United States Patent [19]

Sakai et al.

[11] 3,945,947

[45] Mar. 23, 1976

[54] CATALYST FOR PURIFYING EXHAUST GASES

[75] Inventors: Toshiyuki Sakai, Funabashi; Kazuhide Miyazaki, Tanashi; Michiaki Yamamoto, Hino, all of Japan

[73] Assignee: Mitsui Mining & Smelting Co., Ltd., Tokyo, Japan

[22] Filed: Jan. 8, 1973

[21] Appl. No.: 321,822

[30] Foreign Application Priority Data

Jan. 14, 1972  Japan................................. 47-5882

[52] U.S. Cl............................ 252/466 B; 423/213.5
[51] Int. Cl.$^2$. B01J 21/04; B01J 23/42; B01J 23/44
[58] Field of Search.................. 252/466 PT, 466 B; 423/213.2, 213.5

[56] References Cited
UNITED STATES PATENTS

| | | | |
|---|---|---|---|
| 3,304,150 | 2/1967 | Stover et al...................... | 423/213.5 |
| 3,397,154 | 8/1968 | Talsma............................ | 423/213.2 |
| 3,493,325 | 2/1970 | Roth.............................. | 252/465 X |
| 3,565,574 | 2/1971 | Kearby et al.................... | 252/474 X |
| 3,637,344 | 1/1972 | Thompson et al............. | 252/466 PT |
| 3,699,683 | 10/1972 | Tourtellotte et al............. | 423/213.2 |
| 3,741,725 | 6/1973 | Graham........................... | 423/213.5 |
| 3,767,764 | 10/1973 | Dolbear........................... | 423/213.5 |
| 3,784,675 | 1/1974 | Kobylinski et al............... | 423/213.5 |

FOREIGN PATENTS OR APPLICATIONS 662,460  12/1951  United Kingdom............. 423/213.2

*Primary Examiner*—W. J. Shine
*Attorney, Agent, or Firm*—Woodhams, Blanchard and Flynn

[57] ABSTRACT

A multi-component catalyst composition prepared by combining (A) noble metal catalyst elements effective for oxidizing carbon monoxide and hydrocarbons with (B) catalyst elements effective for the same purpose but containing no noble metal. The multi-component catalyst composition is effective in purifying exhaust gases containing nitrogen oxides, carbon monoxide and hydrocarbons by converting these harmful components into harmless components.

2 Claims, No Drawings

CATALYST FOR PURIFYING EXHAUST GASES

BACKGROUND OF THE INVENTION

1. Field of the Invention

The oxide catalyst component preferably consists of 5 to 10 parts by weight of $Mn_2O_3$, 10 to 20 parts by weight of CuO, 5 to 10 parts by weight of $Fe_2O_3$, 60 to 80 parts by weight of $\gamma$-$Al_2O_3$ and 1 to 5 parts by weight of MgO. Further at least one of those oxides of $Mn_2O_3$, CuO and $Fe_2O_3$ can be plated with 1 to 5 percent by weight of Cu, relative to said oxide.

The inventors have found the fact that, at the time of oxidizing carbon monoxide and hydrocarbons contained in exhaust gases arising from internal combustion engines such as automobile engines and various combustion apparatuses, the use of catalyst elements containing some noble metal or metals, for instance, platinum catalyst elements, in combination with catalyst elements not containing any noble metal, for instance, base metal oxide catalyst elements, gives rise to an unexpected effect, namely, decomposition of nitrogen oxide, which is not an inherent property of the individual catalyst elements. The present invention relates to a catalyst accomplished on the basis of this finding. The term 'catalyst elements' herein means molded catalysts or unitary objects containing catalyst and carrier, which may take various shapes such as pellet-shape, globe-shape, cylinder-shape, plate-shape, etc.

2. Description of the Prior Art

As is well known, for the purpose of making exhaust gases innocuous, the use of different catalysts for treating the respective components of the exhaust gas, that is, oxidizing catalysts for treating carbon monoxide and hydrocarbons and reducing catalysts for treating nitrogen oxides, has hitherto been popular. Accordingly, in order to make harmless the nitrogen oxides, carbon monoxide and hydrocarbons, inclusive, in exhaust gases there has been employed a two-stage purification method comprising, first, decomposing nitrogen oxides so as to make same harmless by means of reducing catalysts without blowing air therein and, second, oxidizing carbon monoxide and hydrocarbons so as to make them harmless by means of oxidizing catalysts in the presence of secondary air blown therein. However, as a matter of fact, the decomposition ratio of nitrogen oxides even by this method has been usually very low, say ranging from several per cent to 30 or 40 per cent at the utmost, and there are instances in which the oxidizing power of said oxidizing catalysts brings about an increase of the nitrogen oxides content, contrary to what is desired.

Accordingly, it has so far been considered extremely difficult to simultaneously convert carbon monoxide, hydrocarbons and nitrogen oxides, inclusive, to make them harmless, and even the attempt to combine reducing catalysts with oxidizing catalysts in various ways has been abandoned without being given serious consideration. Such being the case, nobody has ever discovered the idea of composing a catalyst bed effective for the decomposition of nitrogen oxides by combining fellow oxidizing catalyst elements which do not show any decomposing effect on nitrogen oxides when used individually.

SUMMARY OF THE INVENTION

As a result of series of researches, the inventors have succeeded in composing a catalyst bed by combining catalyst elements comprising noble metal (such as platinum) with other catalyst elements not containing noble metal (such as base metal oxide catalyst elements), both elements possessing the property of promoting the oxidation of carbon monoxide and hydrocarbons. The resulting multi-component catalyst is effective in performing a quite different action of converting nitrogen oxides simultaneously with converting carbon monoxide and hydrocarbons into harmless gases, when the exhaust gas is passed through the catalyst bed in the presence of some air blown therein.

DESCRIPTION OF THE PREFERRED EMBODIMENTS

The noble metal catalysts to be employed in the present invention comprise catalysts prepared by making alumina, silica or other appropriate carrier carry at least one platinum group metal such as Pd, Pt, etc. The amount of noble metal to be thus carried in this case is not particularly different from that employed in general noble metal catalysts, and it is usually less than 1% or thereabout in terms of noble metal relative to the total amount of catalyst including the carrier, although it may exceed that limit on rare occasions. The catalysts not containing noble metal to be employed in the present invention are catalysts not containing platinum group metals, and as typical examples thereof, there are catalysts comprising one or more members of the group consisting of oxides of transition metals coming within the 4th Period of the Periodic Table, such as Ti, V, Cr, Mn, Fe, Co, Ni, Cu and Zn (hereinafter generically referred to oxide catalysts). These oxide catalysts are also often made to contain the so-called carrier components, such as alumina, silica, magnesia, etc. for the purpose of, say, imparting strength thereto. The ratio of noble metal catalyst elements to catalyst elements not containing noble metal for effective combination is in the range of from 1 : 9 to 1 : 1 or thereabout by volume. The way of combining them is not subject to any particular restriction: it will do either to combine them by placing one catalyst on the inlet side and the other on the outlet side, or to combine them by mingling. The appropriate amount of excess oxygen within the gas to be passed through the catalyst bed for converting only carbon monoxide and hydrocarbons is generally said to be about 3 to 4 times as much as the theoretical amount of oxygen, but, in the case of the catalyst according to the present invention, it is to be about 1.5 to 2 times as much as said theoretical amount.

The characteristic feature of the present invention does not lie in the attainment of a high degree of exhaust gas purification efficiency merely as the sum of the efficiencies of the noble metal catalyst and that of the catalyst not containing noble metal, by combining both catalysts. Rather, it lies in the fact that quite a novel, extraneous effect, namely, a high degree of decomposability of nitrogen oxides, which effect cannot be expected from a catalyst bed consisting of any single one of the above catalysts, can be displayed by the catalyst bed as a whole made by combining said catalysts as above.

The reason why said nitrogen oxides decomposability, which does not occur as a result of the separate use of the above catalysts, can be achieved by combining the above catalysts is yet to be theoretically clarified, but at present, it is presumed that, by virtue of the composite effect of the functions of both catalysts, oxidation of carbon monoxide and hydrocarbons may effectively take place in the presence of a relatively small amount of excess air and, at the same time, because the amount of excess air is relatively small, nitrogen oxides may be also catalytically decomposed by carbon monoxide and hydrocarbons.

Hereunder will be given some examples illustrative of the present invention, but it will be understood that the scope of the present invention is not limited thereby.

EXAMPLE 1

Composite catalysts according to the present invention were composed, shaped and arranged as shown in Table 1 below. Various comparative (control) catalysts of noble metal catalysts alone, oxide catalysts alone and mixtures thereof outside the scope of the present invention also were prepared. The catalysts were used under the following conditions for 200 hours. Subsequently, by utilizing the respective catalysts after 200 hours' use as sample, the conversion ratios of $NO_x$, CO and HC were investigated under the same conditions as mentioned above. The results were as shown in Table 1.

Conditions for use of catalyst
engine employed: a 1,600 cc-engine dynamometer
location of catalyst bed: a place at a distance of 1 to 1.7 m from the outlet of exhaust manifold of said engine.
speed of the engine: 2,000 r.p.m.
boost pressure: −100 mmHg
CO concentration of the exhaust gas at the inlet of catalyst bed: 1.8 to 2.3%
ratio of excess oxygen: 160% to 180%)
space velocity of exhaust gas passing through the composite catalyst bed under the present invention: 30,000 to 50,000 hr$^{-1}$ Table 1

| No. of test | No. of catalyst | kind of catalyst | concrete structure of catalyst bed — noble metal catalyst element | concrete structure of catalyst bed — base metal oxide catalyst element | at initial stage conversion ratio % CO | % HC | % $NO_x$ | after 200 hrs' use conversion ratio % CO | % HC | % $NO_x$ |
|---|---|---|---|---|---|---|---|---|---|---|
| I | | composite catalyst | composition: Pt 0.5 wt.%, $Al_2O_3$ 99.5 " | $Al_2O_3$ 70 wt.%, $Mn_2O_3$ 10 ", $Fe_2O_3$ 5 ", CuO 10 ", $Cr_2O_3$ 5 " | | | | | | |
| | | | shape: pellet-shaped | plate-shaped | | | | | | |
| | | | arrangement: disposed on the inlet side | disposed on the outlet side | | | | | | |
| | (1) (a) (comparative catalyst) | | combination ratio 0.5 part by vol. | 6.5 parts by vol. | 96 | 73 | 65 | 86 | 62 | 63 |
| | (b) (present catalyst) | | 1 part by vol. | 6 parts by vol. | 97 | 74 | 70 | 87 | 63 | 69 |
| | (c) (comparative catalyst) | | 4 parts by vol. | 3 parts by vol. | 98 | 75 | 48 | 80 | 67 | 41 |
| | (2) | noble metal catalyst only (comparative catalyst) | same as (1) in composition, shape and amount employed (7 parts by vol.) | | 98 | 73 | 10 | 78 | 57 | 5 |
| | (3) | base metal oxide catalyst only (comparative catalyst) | | same as (1) in composition, shape and amount employed (7 parts by vol.) | 97 | 72 | 62 | 84 | 62 | 60 |
| II | (4) | composite catalyst | composition: Pt 0.1 wt.%, $Al_2O_3$ 99.9 " catalyst after 200 hrs' use under the foregoing condition of | $Al_2O_3$ 60 wt.%, $Mn_2O_4$ 20 ", $Fe_2O_3$ 10 ", CuO 10 " use | | | | | | |
| | | | shape: pellet-shaped | pellet-shaped | | | | | | |
| | | | arrangement: nobel metal catalyst was interposed between base metal oxide catalysts | | | | | | | |
| | (a) (comparative catalyst) | | combination ratio 0.5 part by vol. | 8.5 parts by vol. | 97 | 78 | 63 | 89 | 73 | 60 |
| | (b) (present | | 1 part by vol. | 8 parts by vol. | 97 | 77 | 68 | 95 | 75 | 65 |

Table 1-continued

| No. of test | No. of cata- lyst | kind of catalyst | concrete structure of catalyst bed | | at initial stage conversion ratio | | | after 200 hrs' use conversion ratio | | |
|---|---|---|---|---|---|---|---|---|---|---|
| | | | noble metal catalyst element | base metal oxide catalyst element | % CO | % HC | % NO$_x$ | % CO | % HC | % NO$_x$ |
| | | catalyst) | | | | | | | | |
| | | (c) (comparative catalyst) | 5 parts by vol. | 4 parts by vol. | 90 | 70 | 43 | 85 | 68 | 43 |
| | (5) | noble metal catalyst only (comparative catalyst) | same as (4) in com- position, shape and amount employed (9 parts by vol.) | | 80 | 62 | 3 | | | |
| | (6) | base metal oxide catalyst only (comparative catalyst) | | same as (4) in composition, shape and amount employed (9 parts by vol.) | 97 | 78 | 43 | 83 | 56 | 42 |
| III | | composite catalyst | composition Pt 1.5 wt.% Al$_2$O$_3$ 98.5 " | Al$_2$O$_3$ 55 wt.% Mn$_2$O$_3$ 30 " Fe$_2$O$_3$ 5 " MgO 2 " CuO 8 " | | | | | | |
| | | | shape pellet-shaped arrangement both elements were packed upon mixing together | pellet-shaped | | | | | | |
| | (7) | (a) (comparative catalyst) | combination ratio 0.5 part by vol. | 6.5 parts by vol. | 96 | 69 | 65 | 90 | 60 | 63 |
| | | (b) (present catalyst) | 2 parts by vol. | 5 parts by vol. | 96 | 71 | 68 | 92 | 63 | 68 |
| | | (c) (present catalyst) | 3 parts by vol. | 4 parts by vol. | 96 | 73 | 66 | 91 | 64 | 64 |
| | (8) | noble metal catalyst only (comparative catalyst) | same as (7) in com- position, shape and amount employed (7 parts by vol.) | | 96 | 74 | 18 | 69 | 55 | 11 |
| | (9) | base metal oxide catalyst only (comparative catalyst | | same as (7) in composition, shape and amount employed (7 parts by vol.) | 96 | 68 | 50 | 80 | 59 | 48 |
| IV | (10) | composite catalyst | composition Pd 0.5 wt.% Al$_2$O$_3$ 99.5 " | Al$_2$O$_3$ 68 wt.% Mn$_2$O$_3$ 8 " Fe$_2$O$_3$ 8 " CuO 13 " MgO 2 " Cu 1 "* | | | | | | |
| | | | shape plate-shaped arrangement disposed on the inlet side | plate-shaped disposed on the outlet side | | | | | | |
| | | (a) (comparative catalyst) | combination ratio 0.5 part by vol. | 9.5 parts by vol. | 98 | 65 | 65 | 86 | 58 | 63 |
| | | (b) (present catalyst) | 4 parts by vol. | 6 parts by vol. | 98 | 65 | 69 | 93 | 59 | 65 |
| | | (c) (comparative catalyst) | 6 parts by vol. | 4 parts by vol. | 98 | 61 | 25 | 85 | 55 | 22 |
| | (11) | noble metal catalyst only | same as (10) in com- position, shape and amount employed (10 parts by vol.) | | 98 | 62 | 22 | 78 | 50 | 8 |
| | (12) | base metal oxide catalyst only | | same as (10) in composition, shape and amount employed (10 parts by vol.) | 98 | 62 | 64 | 80 | 55 | 58 |

* Cu which was electroless-plated on

Table 1-continued

| No. of test | No. of catalyst | kind of catalyst | concrete structure of catalyst bed | | at initial stage conversion ratio | | | after 200 hrs' use conversion ratio | | |
|---|---|---|---|---|---|---|---|---|---|---|
| | | | noble metal catalyst element | base metal oxide catalyst element | % CO | % HC | % $NO_x$ | % CO | % HC | % $NO_x$ |
| | | | | the particles of $Mn_2O_3$, $Fe_2O_3$ and CuO | | | | | | |

(Remarks)
(1) The total volume of catalyst employed for each of Test No. 1 through No. IV was the same.
(2) HC: hydrocarbons in n-hexane equivalent

EXAMPLE 2

Conversion ratio was measured by employing catalyst No. (10) (b), test No. IV in Example 1 and applying the same conditions as in Example 1 except for modifying the ratio of excess oxygen to be 330 to 370%. Table 2 below shows the resulting data as compared with the data in the case of the ratio of excess oxygen being 160 to 180% as shown in Table 1 above. As is evident from this table, when a catalyst under the present invention is applied and the ratio of excess oxygen is in the range of 160 to 180%, the CO and HC conversion ratio does not decrease much while the $NO_x$ conversion ratio increases remarkably as compared with the case of the ratio of excess oxygen being in the range of 330 to 370%.

Table 2

| catalyst | ratio of excess oxygen (%) | conversion ratio at initial stage (%) | | | conversion ratio after 200 hrs' use (%) | | |
|---|---|---|---|---|---|---|---|
| | | CO | HC | $NO_x$ | CO | HC | $NO_x$ |
| catalyst No. (10) (b) for Test No. IV in Example 1 | 160 to 180 | 98 | 65 | 69 | 93 | 59 | 65 |
| " | 330 to 360 | 99 | 80 | 40 | 95 | 70 | 36 |

What is claimed is:

1. A single catalyst bed for purifying exhaust gases from combustion operations by transforming CO, hydrocarbons and nitrogen oxides into harmless substances, consisting essentially of two catalyst components A and B, wherein
   component A consists essentially of at least one metal selected from the group consisting of Pd and Pt, said metal being supported on an inert catalyst carrier, and component B consists essentially of 5 to 10 parts by weight of $Mn_2O_3$, 10 to 20 parts by weight of CuO, 5 to 10 parts by weight of $Fe_2O_3$, 60 to 80 parts by weight of gamma aluminum oxide and 1 to 5 parts by weight of MgO.

2. A single catalyst bed as claimed in claim 1 in which the volumetric ratio of component A: component B is in the range of 1:9 to 1:1.

* * * * *